United States Patent [19]

Vaseen

[11] 4,049,398

[45] Sept. 20, 1977

[54] SEPARATING OXYGEN FROM THE AIR BY MEANS OF DISSOLVING AIR IN A NONMAGNETIC, INERT LIQUID AND THEN PARAMAGNETICALLY COLLECTING THE OXYGEN FROM THE LIQUID

[76] Inventor: Vesper A. Vaseen, 9840 W. 35th Ave., Wheatridge, Colo. 80033

[21] Appl. No.: 691,037

[22] Filed: May 28, 1976

[51] Int. Cl.$^2$ .............................................. B03C 1/00
[52] U.S. Cl. ................................................ 55/3; 55/36; 55/68; 55/84; 55/100
[58] Field of Search ................... 55/3, 100, 68, 36, 84; 210/222, 243

[56] References Cited

U.S. PATENT DOCUMENTS

| 341,727 | 5/1886 | Cabell | 210/243 |
|---|---|---|---|
| 1,056,043 | 3/1913 | Morrison | 55/3 |
| 1,056,244 | 3/1913 | Wiley | 55/68 |
| 1,722,458 | 7/1929 | De Baufre | 55/68 |
| 3,177,633 | 4/1965 | McDonald, Jr. | 55/3 |
| 3,762,133 | 10/1973 | Merriman et al. | 55/68 |

*Primary Examiner*—Bernard Nozick

[57] ABSTRACT

Separating oxygen from air by dissolving florocarbon or silicone liquid and passing the liquid between the poles of magnet to causing the oxygen to collect at the poles form bubbles and is collected.

1 Claim, No Drawings

SEPARATING OXYGEN FROM THE AIR BY MEANS OF DISSOLVING AIR IN A NONMAGNETIC, INERT LIQUID AND THEN PARAMAGNETICALLY COLLECTING THE OXYGEN FROM THE LIQUID

The system of aeration of the inert liquid and the removal of the dissolved oxygen can both be operated as a pressure control system or either the aeration and/or the paramagnetic oxygen collection system by operated independently as a pressure (vacuum) control system.

The aeration of the nonmagnetic inert liquid under positive pressure increases both the oxygen and nitrogen solubility of the fluid; which necessarily requires the paramagnetic removal of magnetic oxygen in the electro-magnet be kept under at least equal pressure to retain the dissolved nitrogen in solution until the oxygen has been paramagnetically removed, thus preventing nitrogen contamination of the collected oxgyen gas.

Negative pressure of reduction from a positive pressure, at the electromagnet will when following the electromagnet, release the dissolved nitrogen for either collection or dissipation back to atmosphere.

Heat is generated at the electromagnet due to the necessity to highly saturate the iron core of the magnet with gauss forces. This heat can be partially removed by the specific heat factor of the nonmagnetic inert liquid; and/or more practically by a separate heat exchanger system; thus salvaging the heat for use to reduce other power requirements; and/or use following the electromagnet, para magnetic removal of oxygen; to heat the nonmagnetic inert fluid to strip the nitrogen by heat stripping.

A combination of two physical factors makes it possible to collect dissolved oxygen from a liquid in a manner applicable to commercial production of gaseous oxygen. These two factors are the affinity for certain liquids to dissolve more air and this oxgyen than some other liquids; and the fact that oxygen molecules are paramagnetic and can then be magnetically removed from these specific liquids or fluids as gaseous exygen.

Magnetic separation falls under two principal types of governing physical phenomena. Strongly magnetic materials, known as ferromagnetic group, are easily magnetized by a relatively weak magnetic field. As the strength of the magnetic field increases, all the jindividual domains (regions with paired north and south magnetic poles) in a ferromagnetic material become aligned; and magnetization "saturates" the material. Thereafter its magnetic qualities increase very little, if at all, regardless of any further increase in the strength of a magnetic field around the material. The saturation level, that is, the field strength beyond which no further magnetization takes place, depends on the iron content of the material. Pure iron, for example is saturated at a magnetization of some 220 electromagnetic units per cubic centimeter in an applied field of several hundred gauss.

Weaker magnetic materials, known as members of the paramagnetic group, are much less susceptible to an applied magnetic field. Paramagnetic materials rarely become saturated so their degree of magnetization continues to increase as the applied magnetic field gets stronger. Although a strong bar magnet will not attract a paramagnetic material, such materials may become more highly magnetized in a sufficiently strong field than dilute ferromagnetic materials.

A third type of behavior in a magnetic field is displayed by materials that become magnetic in an opposite direction to the applied field. These are known as diamagnetic materials.

Ferromagnetic type particulate materials we can classify as "hard" materials and think of them as magnetized particles each acting temporarily as a small bar magnet with a north pole at one end and a south pole at the other end. These magnetically hard materials act as permanent magnets.

Materials which align as magnetic only while in a magnetic field and become random when the field is absent; is herein called "soft" material.

When a uniform magnetic field is applied to a magnetized particle, the forces acting on the two poles of the particle are equal and opposite. When an applied magnetic field differs in intensity at the two extremes of a particle, then a net differential magnetic force acts on the particle. The net force exerted on a magnetized particle by a magnetic field is porportional to: (1) the intensity of the magnetization the field has induced in the particle: (2) the volume of the particle; (3) the gradient of the exerted magnetic field; that is, the difference between the intensity of the field at one end of the particle; and the intensity of the field at the other end of the particle.

Paramagnetic materials require a magnetic field of great enough intensity as to cause magnetization of the particles, as well as sufficient gauss flux gradient as to cause the particles to orient with temporary north and south poles.

Some 32 elements form compounds which can be paramagnetic, and 16 elements are paramagnetic in pure form, but the compounds they form are diamagnetic. 7 elements become paramagnetic when one or more are present in a compound; although two of them (N) nitrogen and (Cu) copper are slightly diamagnetic in pure form. It is only necessary here to be interested in oxygen, nitrogen and the nonmagnetic liquid carrier of the absorbed oxygen and nitrogen.

Oxygen being one of the sixteen elements which become paramagnetic in pure form is magnetic and can by being magnetically attracted thus collected from the liquid. Nitrogen being slightly diamagnetic in pure form is thus rejected and left absorbed in the fluid. The choice of either fluorcarbon type of nonmagnetic fluids or silicone fluids both as compounds. First of carbon and fluoride which are nonmagnetic and second as silicon and oxygen which become slightly diamagnetic are therefore compatible for use as the nonmagnetic type liquid to carry the dissolved oxygen to the electromagnetic producing the supermagnetic forces (gausses) necessary to extract the absorbed oxygen as free oxygen gas on the magnetic poles and thence to storage and/or use.

The oxygen molecules when in the presence in an intense magnetic field orient as polar molecules with a north and a south pole. Due to the creation of a gradient field the oxygen molecules are then oriented and by nature of the differential forces on the poles created by the gradient field attracted north polar oriented to the south magnetic pole and vice versa. Molecular oxygen collected at each pole combine as they accumulate to form bubbles of free oxygen gas as the concentration exceeds the solubility of the liquid for absorbed oxygen and release themselves from the liquid as bubbles of oxygen to be collected for removal to storage and/or use.

Inert nonmagnetic fluid or liquid carrier of the absorbed oxygen should in general meet the following specifications:

1. Be a liquid at ambient temperatures and remain a liquid at elevated temperature desired for stripping surplus nitrogen gas from solution. (If heat stripping designed as full or partial nitrogen stripping operation).
2. Remain a low viscosity liquid at ambient and elevated temperatures designed for the system process.
3. Have an affinity for absorbing air and thus oxygen and nitrogen.
4. Remain as an inert liquid in regards to the quantity of oxygen absorbed in the liquid at both ambient as well as elevated temperature used in system process; also at atmospheric as well as pressurized system.
5. Remain as a non volatile, or practically so, liquid at any conditions of (4) above.
6. Remain in same physical and chemical state — prior to aeration to absorb air (oxygen); during aeration; during magnetic removal of absorbed oxygen; as well as during heat stripping of nitrogen (if desired nitrogen removal process), up to boiling point temperature of the liquid at pressure(s) of operation selected.
7. Remain a nonmagnetic or diamagnetic liquid at ambient atmospheric conditions; and temperature/pressure conditions designed for the electromagnetic oxygen separation and collection phase of the process. Some of the liquids which can be considered for the liquid, dissolved oxygen carrier, but not inclusive of-are: silicone fluids; fluorocarbones, and related similar compounds.
8. Although not mandatory the nonmagnetic inert liquid should also have nonflammable, non toxic (humans), characteristics.

The flow sheet for the process requires a pressure vessel retaining the nonmagnetic inert liquid thru which pressurized air is passed until the liquid has reached saturation of absorbed oxygen capability. While air is being passed thru or mixed with the fluid, nitrogen absorbed in the liquid will be stripped or the absorbed nitrogen will resist further saturation thus allowing the nitrogen in the regenerated air to pass on thru the liquid to discharge. If nitrogen accumulation is also a goal of the process it is collected, stored and then used. If nitrogen is not an additional goal of the process the pressure vessel can be replaced by open type mixing devices for intimately passing air thru or in contact with large surface areas of the liquid for air (oxygen) transfer by absorption in the liquid, allowing nitrogen to return to atmosphere.

The air (oxygen) saturated nonmagnetic, inert liquid is passed thru the two magnetic poles, north and south, of an electromagnetic in a quantity and with a velocity which provide the time required, permit the absorbed oxygen molecules in the presence of gauss forces sufficient to cause paramagnetic magnetization of the oxygen molecules, to be magnetically attracted to the two poles, north and south, and at or near the magnetic pole surfaces, exceed the solubility ability of the liquid to retain the oxygen as absorbed oxygen, and thus release it as bubbles of free collective molecules, to the oxygen gas collector also installed at or near the surface of the liquid and between the two magnetic poles of the electromagnet.

In a pressurized system the oxygen gas can be removed at atmospheric pressure to storage, thence compression and use; or in an atmospheric system be collected by a vacuum (negative pressure) system to storage, compression and use.

The imposing of very high intensity gauss forces at the electromagnetic to induce paramagnetizm reactions on the absorbed oxygen molecules will produce heat. This heat can be designed to be collected by the specific heat capacity of the nonmagnetic inert liquid, to assist in nitrogen stripping or it can be externally removed by circulating other fluid and heat exchanger transfer from the magnet core iron to the auxilliary fluid.

The oxygen depleted nonmagnetic, inert liquid is cooled by additional heat exchange method prior to being returned for aeration and repeat of cycle.

I claim:

1. An improvement in the Art and Science of recovering or concentrating oxygen from air by first absorbing or dissolving air in either fluorocarbon or silicone liquid, under pressure in order to increase the quantity of dissolved oxygen per unit of volume, then passing the oxygen saturated fluorocarbon or silicone liquid through or between the North and South Poles of a high intensity magnetic field; which by the paramagnetic qualities of oxygen causes the oxygen to collect at the magnetic poles of the electromagnet and form bubbles of pure oxygen which releases for collection and use.

* * * * *